United States Patent
Boucadair et al.

(10) Patent No.: US 11,563,816 B2
(45) Date of Patent: Jan. 24, 2023

(54) METHODS FOR MANAGING THE TRAFFIC ASSOCIATED WITH A CLIENT DOMAIN AND ASSOCIATED SERVER, CLIENT NODE AND COMPUTER PROGRAM

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/256,377

(22) PCT Filed: Jun. 28, 2019

(86) PCT No.: PCT/FR2019/051605
§ 371 (c)(1),
(2) Date: Dec. 28, 2020

(87) PCT Pub. No.: WO2020/002853
PCT Pub. Date: Jan. 2, 2020

(65) Prior Publication Data
US 2021/0160330 A1 May 27, 2021

(30) Foreign Application Priority Data

Jun. 29, 2018 (FR) ....................... 1856024

(51) Int. Cl.
*G06F 15/16* (2006.01)
*H04L 67/148* (2022.01)

(52) U.S. Cl.
CPC .................. *H04L 67/148* (2013.01)

(58) Field of Classification Search
CPC ..... H04L 67/148; H04L 67/14; H04L 67/141; H04L 65/1066
(Continued)

(56) References Cited

U.S. PATENT DOCUMENTS 7,739,328 B1 * 6/2010 Champion ............... H04L 67/61
709/203
8,675,488 B1 * 3/2014 Sidebottom ........... H04L 67/148
370/235

(Continued)

OTHER PUBLICATIONS

English translation of the Written Opinion of the International Searching Authority dated Oct. 18, 2019 for corresponding International Application No. PCT/FR2019/051605, filed Jun. 28, 2019.
(Continued)

*Primary Examiner* — Bharat Barot
(74) *Attorney, Agent, or Firm* — David D. Brush; Westman, Champlin & Koehler, P.A.

(57) ABSTRACT

A method for managing traffic associated with a client domain, implemented in a server. The method includes: detecting a communication problem between the server and at least one first client node of the client domain, called failed node, identifying at least one second client node belonging to the client domain, verifying if a session between the server and the at least one second client node is active, and if no session is active: triggering a mitigation procedure on at least one IP resource associated with the client domain if at least one session is active: the use of the second client node associated with the at least one active session, called active node, to initiate an action managing the traffic associated with the client domain.

15 Claims, 9 Drawing Sheets

(58) Field of Classification Search
USPC .................................. 709/202–203, 226–227
See application file for complete search history.

(56) References Cited

U.S. PATENT DOCUMENTS

| | | | | |
|---|---|---|---|---|
| 10,666,503 | B1* | 5/2020 | Kryvokrysenko | .... H04L 67/148 |
| 2002/0174220 | A1* | 11/2002 | Johnson | .................. H04L 67/42 |
| | | | | 709/224 |
| 2006/0053487 | A1* | 3/2006 | Jeffries | ............... H04L 63/1458 |
| | | | | 726/22 |
| 2008/0086556 | A1* | 4/2008 | Ramalingam | ..... H04L 29/12066 |
| | | | | 709/223 |
| 2011/0225230 | A1* | 9/2011 | Russ | ..................... H04L 67/142 |
| | | | | 709/203 |
| 2015/0334123 | A1 | 11/2015 | Di Pietro et al. | |
| 2017/0223050 | A1* | 8/2017 | Holloway | ........... H04L 63/1466 |

OTHER PUBLICATIONS

International Search Report and Written Opinion dated Oct. 10, 2019 for corresponding International Application No. PCT/FR2019/051605, filed Jun. 28, 2019.

French Search Report and Written Opinion dated Dec. 13, 2018 for corresponding French Application No. 1856024, filed Jun. 29, 2018.

Mortensen et al., "Distributed-Denial-of-Service Open Threat Signaling (DOTS) Architecture; draft-ietf-dots-architecture-05.txt", Distributed Denial of Service Open Threat Signaling (DOTS) Architecture Draft IETF DOTS Architecture-05 txt; Internet Draft: DOTS, Internet Engineering Task Force, IETF; Standard working draft, Internet Society (ISOC) 4, Rue Des Falaises CH-1205 Gene, No. 5, Oct. 26, 2017 (Oct. 26, 2017), pp. 1-30, XP015122508.

Reddy et al., "Distributed Denial-of-Service Open Threat Signaling (DOTS) Signal Channel Specification", draft-ietf-dots-signal-channel-17, Jan. 22, 2018.

Reddy et al., "Distributed Denial-of-Service Open Threat Signaling (DOTS) Data Channel", draft-ietf-dots-data-channel-11, Dec. 18, 2017.

E. Rescorla et al., "Datagram Transport Layer Security Version 1.2", RFC 6347, DOI 10.17487/RFC6347, Jan. 2012.

E. Rescorla et al., "The Datagram Transport Layer Security (DTLS) Protocol Version 1.3", draft-ietf-tls-dtls13-22, Nov. 29, 2017.

T. Dierks et al., "The Transport Layer Security (TLS) Protocol Version 1.2", RFC 5246, DOI 10.17487/RFC5246, Aug. 2008.

E. Rescorla, "The Transport Layer Security (TLS) Protocol Version 1.3", draft-ietf-tlstls13-23, Jan. 5, 2018.

* cited by examiner

METHODS FOR MANAGING THE TRAFFIC ASSOCIATED WITH A CLIENT DOMAIN AND ASSOCIATED SERVER, CLIENT NODE AND COMPUTER PROGRAM

CROSS-REFERENCE TO RELATED APPLICATIONS

This Application is a Section 371 National Stage Application of International Application No. PCT/FR2019/051605, filed Jun. 28, 2019, which is incorporated by reference in its entirety and published as WO 2020/002853 A1 on Jan. 2, 2020, not in English.

1. Field of the Invention

The field of the invention is that of communications within a communication network, for example an IP network, and particularly that of value-added IP services.

More specifically, the invention provides a solution for managing the traffic associated with a client domain, i.e. entering a client domain or leaving a client domain, in the event that a communication problem is detected between the server and a client node of the client domain.

In particular, the invention provides a solution to avoid the systematic triggering of a mitigation procedure in case of loss of connection between a server and a client node.

In particular, the invention has applications in the field of mitigating Distributed Denial of Service (DDoS) attacks, for example, by implementing, but exclusively, a DDoS Open Threat Signaling (DOTS) architecture, as standardized by the IETF.

2. Prior Art

As a reminder, a DDoS attack is an attempt to make resources, for example network or computing resources, unavailable to their users. Such attacks can be massively deployed by compromising a large number of hosts, and using these hosts to amplify the attacks.

In order to mitigate these DDoS attacks, DDoS attack detection and mitigation services are offered by some access or service providers to their customers. Such mitigation services (DDoS Protection Services) can be hosted within the infrastructures operated by the access providers or in the cloud. In particular, they make it possible to distinguish between "legitimate" traffic, i.e., data consented to by the user, and "suspicious" traffic.

When a DPS-type service is hosted in the cloud, it is difficult to identify a DDoS attack in advance, because such a service is not present on the routing paths (by default) used to reach the network that is the victim of a DDoS attack.

To solve this problem, it has notably been proposed to set up tunnels to force the traffic (incoming or outgoing) onto a site or network to be inspected by the DPS service. However, this approach significantly increases the latency observed by the users and imposes constraints on the sizing of the DPS service to be able to handle all incoming or outgoing traffic from all the users of the network.

When a DPS-type service is hosted within an infrastructure operated by an access provider, even if the DPS service is present in the routing path of incoming or outgoing traffic of a network, difficulties may arise in identifying suspicious traffic. In particular, with the increase in encrypted traffic, especially carried on UDP (for example, QUIC traffic "Quick UDP Internet Connection"), it is difficult to distinguish legitimate traffic from suspicious traffic. The difficulty of accessing plain text control messages, such as the "SYN/SYN-ACK/ACK" messages provided for in the TCP protocol, can indeed make verification of a network node's consent to receive traffic complex.

In order to help identify suspicious traffic, a specific architecture has been standardised by the IETF. Such an architecture, called DOTS, allows a client node, called a DOTS client, to inform a server, called a DOTS server, that its network is subject to a DDoS attack and that appropriate actions are required.

Thus, if a client domain is the target of a DDoS attack, a DOTS client attached to that client domain can send a message to the DOTS server asking for help. The latter coordinates with a mitigator to ensure that suspicious traffic associated with the denial of service attack is no longer routed to the client domain, while legitimate traffic continues to be routed normally to the client domain.

This solution uses two communication channels between the DOTS client and the DOTS server:
a DOTS Signal Channel, and
a DOTS Data Channel.

The DOTS signal channel is only used when a DDoS attack is in progress. Thus, a DOTS client can use this channel to request help from the DOTS server. For example, a DOTS client uses this signal channel to send a request to the server informing it that the prefix "1.2.3.0/24" is under a DDoS attack, so that the server can take action to stop the attack. Such a request is associated with a DOTS client identified by a unique identifier, noted for example CUID ("Client Unique Identifier").

A DOTS server can thus take appropriate action to stop a DDoS attack if the request from the DOTS client does not conflict with other requests from other clients in the same client domain, or with a filter rule previously installed on the server by another client of the client domain, and if the server is enabled/configured to honour the last request received. In the event of conflict, the server can send an error message, for example type 4.09 ("Conflict"), to inform the client.

Such a signal channel is notably described in the document "*Distributed Denial-of-Service Open Threat Signaling (DOTS) Signal Channel Specification*", draft-ietf-dots-signal-channel, Reddy, T. et al., January 2018.

The DOTS data channel is used when no DDoS attack is in progress. For example, a DOTS client can use this channel to set up filter rules, such as filtering traffic received from certain addresses or traffic destined for a given node. For example, a DOTS client can use this DOTS data channel to instruct the server to block all traffic to the prefix "1.2.3.0/24".

The DOTS server can install filter rules in response to a request from a client, if that request does not conflict with other requests from other clients in the same client domain or with an existing filter rule. If there is a conflict with other rules maintained by the DOTS server, the server may send an error message, for example, type 409 ("Conflict"), to inform the client.

Such a data channel is described in "*Distributed Denial-of-Service Open Threat Signaling (DOTS) Data Channel*", draft-ietf-dots-data-channel, Reddy, T. et al. December 2017.

According to the procedure described in the two above-mentioned documents, there is a risk that a DOTS server may refuse to process an attack mitigation request sent by a DOTS client when the attack is real, or refuse filtering requests sent by a DOTS client (one purpose of filtering requests being to anticipate DDoS attacks). Such a refusal can occur, for example, when clients of the client domain have previously asked the server to install filter rules, but these rules are no longer justified (stale).

In addition, the DOTS architecture has been designed to support automatic mitigation of denial of service attacks by a server in case of loss of the established session with a DOTS client. The implementation of this procedure is dependent on the value of a mitigation trigger parameter, noted "trigger-mitigation", associated with a DOTS client of the client domain during a configuration negotiation phase.

In other words, if the value of this mitigation trigger parameter is set by the DOTS client to "FALSE", the DOTS server automatically triggers a mitigation procedure if it no longer receives messages from this DOTS client.

For example, as long as the DOTS server receives regular presence messages from the DOTS client, for example of the "Heartbeat" type, incoming traffic (i.e. destined for the client domain) is routed normally through routers located on the default path. If the DOTS server no longer receives messages from the DOTS client, it decides to trigger the automatic mitigation procedure. Incoming traffic can thus be redirected to a traffic DDoS scrubber or DDoS scrubbing center, which removes DDoS attack traffic.

It should be noted that such an automatic triggering of a mitigation procedure can be problematic in the case where the absence of a message from a DOTS client is not due to a DDoS attack, but to another problem (software problem, ongoing maintenance operation without proper closure of the DOTS session, unavailable intermediate node, etc.).

In particular, redirecting incoming traffic to a scrubbing center can be harmful to the client because it increases the time it takes for traffic to be transferred or even prevents it from being routed, while the absence of a message from a DOTS client is not necessarily due to a DDoS attack.

In addition, if a DOTS client becomes inactive or disconnected, a DOTS server may remove all filters activated by that client, which may interfere with the proper routing of traffic to the client domain.

There is therefore a need for a new technique for managing the traffic associated with a client domain, allowing for example the automatic triggering of a mitigation procedure to be avoided when such a procedure is not justified because there is no attack in progress.

3. SUMMARY OF THE INVENTION

The invention provides a novel solution for managing traffic associated with a client domain, i.e. entering the client domain or leaving the client domain, implemented in a server, comprising:
- detecting a communication problem between the server and at least one first client node of the client domain, called failed node,
- identifying at least one second client node belonging to the client domain,
- verifying if a session between the server and the second client node(s) is active, and
  - if no session is active: triggering a mitigation procedure on at least one IP resource associated with the client domain,
  - if at least one session is active: using the second client node(s) associated with the active session(s), called active node(s), to initiate an action managing the traffic associated with the client domain.

Thus, the proposed solution is based on the use of at least one second client node of the client domain, in the event of failure of the first client node, to trigger an action to manage the incoming and/or outgoing traffic of the client domain.

The proposed solution is therefore based on cooperation between different client nodes belonging to the same client domain.

For example, such an action for managing the traffic involves confirming that an attack is in progress on at least one IP resource associated with the client domain, or redirecting at least a part of the traffic associated with at least one IP resource of the client domain to a second active node.

According to at least one embodiment, the proposed solution makes it possible to improve the reliability of responses to DDoS attacks and the coordination between client nodes of the same domain, in particular the coordination of DDoS attack mitigation actions, by involving at least one other client of the domain to verify the reality of an attack.

The solution proposed in this way thus avoids increasing the transfer time of incoming packets when they are unjustifiably routed to a traffic scrubber.

In particular, according to at least one embodiment, the proposed solution makes it possible to force the path taken by the traffic to solicit one or more other client nodes during a given period. Therefore, if a DDoS attack is effective, this or these client node(s) will be able to report this attack to the server. If the server does not receive a message signalling an attack and requiring the implementation of a mitigation procedure, the traffic can be redirected to the nominal path.

Furthermore, according to at least one particular embodiment, such a cooperation between DOTS clients of the same domain makes it possible to detect and eliminate obsolete entries ("stale") in the tables maintained by the server, for example filtering rules that are no longer justified following the expiry of a session between the client and the server. Thus, the solution proposed according to this particular embodiment can ensure a coherence of the configuration of several clients belonging to the same domain.

In particular, the proposed solution allows a client node of the client domain to inform the server that it can delete entries associated with IP resources managed by another client node of the client domain.

It is equally noted that the proposed management method can, according to at least one embodiment, apply to outgoing traffic from the client domain. For example, the server can detect an attack originating from the client domain. It can then notify the client domain and possibly filter outgoing traffic.

Other embodiments of the invention relate to an associated server and client node.

In another embodiment, the invention relates to one or more computer programs comprising instructions for implementing the method for managing the traffic associated with a client domain according to at least one embodiment of the invention, when this or these programs is/are executed by a processor.

In yet another embodiment, the invention relates to one or more information mediums, irremovable, or partially or totally removable, computer-readable, and comprising instructions from one or more computer programs for executing the steps of the method for managing the traffic associated with a client domain according to at least one embodiment of the invention. The methods according to the invention can therefore be implemented in various ways, notably in wired form and/or in software form.

4. LIST OF FIGURES

Other characteristics and advantages of the invention will emerge more clearly upon reading the following description of a particular embodiment, provided as a simple illustrative non-restrictive example, and the annexed drawings, wherein.

5. DESCRIPTION OF AN EMBODIMENT OF THE INVENTION 5.1 General Principle

The general principle of the invention is based on the use of at least one second client node, belonging to a client domain, to manage the traffic entering or leaving the client domain, in case of a communication problem between the server and a first client node.

Figure 1:
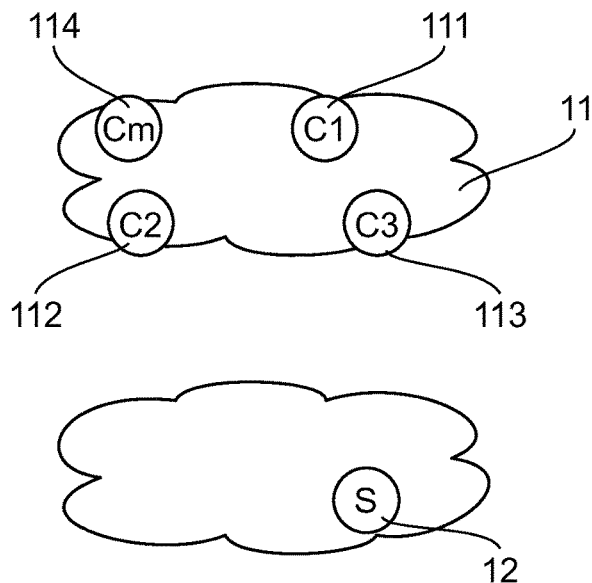
FIG. 1 shows an example of a communication network implementing a method for managing traffic associated with a client domain, according to an embodiment of the invention.

In relation to FIG. 1, different equipment of a communication network implementing a method for managing the incoming or outgoing traffic of a client domain according to an embodiment of the invention is presented.

For example, several client nodes C1 111, C2 112, C3 113, Cm 114 belonging to client domain 11, communicating with a server S 12 are considered. For example, client domain 11 contains one or more machines, also called nodes. The term "domain" is used here to refer to a set of machines or nodes under the responsibility of the same entity.

According to the example shown, server 12 does not belong to client domain 11. In another example not shown, server 12 can belong to client domain 11.

Figure 2:
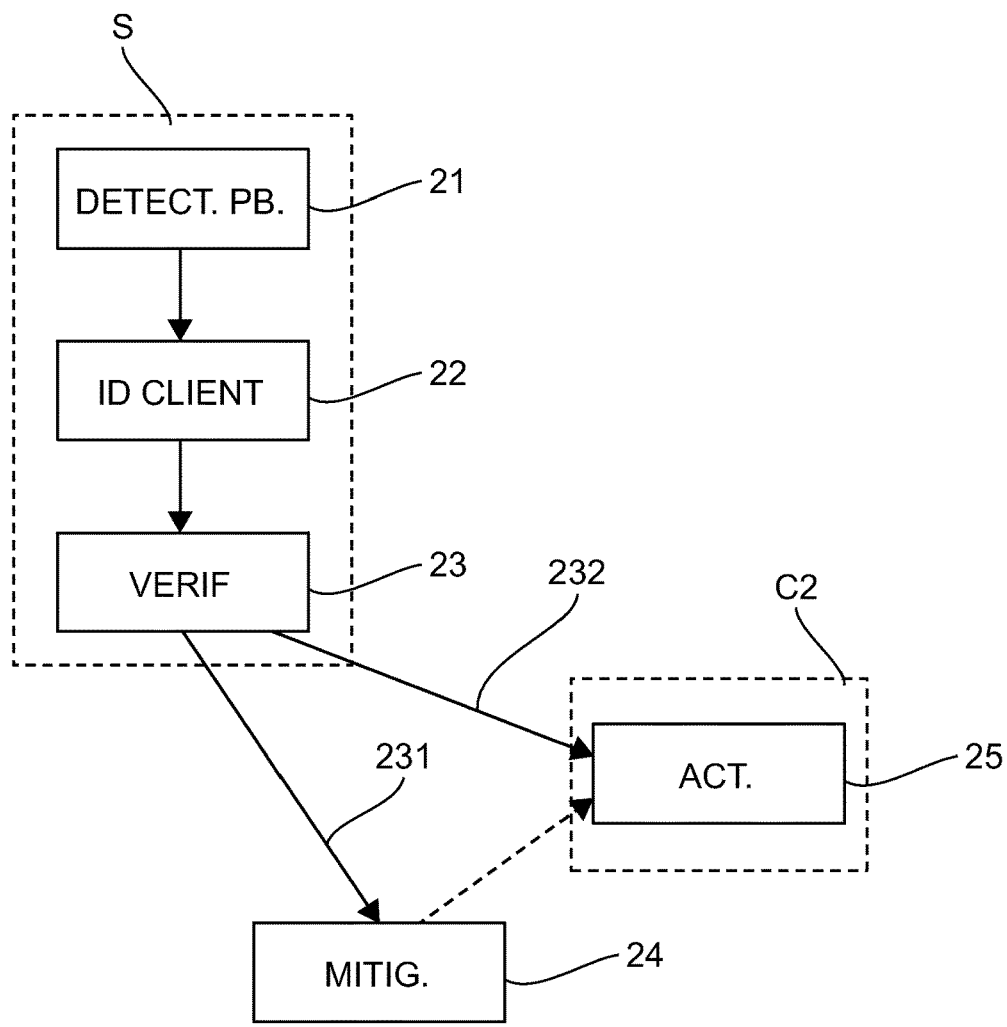
FIG. 2 shows the main steps of the method for managing traffic associated with a client domain, according to a particular embodiment of the invention.

FIG. 2 illustrates the main steps implemented for managing the traffic associated with client domain 11.

Server 12 detects (21) a communication problem with a first node of the client domain, called failed node. For example, a communication problem is detected if a session between Server 12 and the failed node is inactive for a period greater than or equal to a predetermined threshold. In particular, a session may be considered inactive if no presence message (for example, of the "heartbeat" type), intended to verify that a remote peer is still active, is received after a duration greater than or equal to a predetermined threshold noted Th If a communication problem is detected between the server 12 and, for example, the node C1 111, the server identifies (22) at least one second client node belonging to client domain 11.

The server verifies (23) if at least one session is active between server 12 and the second client node(s).

If no session is active (231), a mitigation procedure 24 on at least one IP resource associated with the client domain is triggered. According to a particular embodiment, if no session is active, the triggering of a mitigation procedure is implemented on all IP resources associated with the client domain.

If at least one session is active (232), the second node associated with the active session(s), called active node, e.g. C2 112, is used (25) to initiate an action for managing the traffic of the client domain.

According to a particular embodiment, if the number of inactive sessions is greater than or equal to a predetermined threshold, the mitigation procedure 24 is triggered on at least one IP resource associated with the client domain, and possibly on all IP resources associated with the client domain. For example, such a mitigation procedure is implemented if more than half of the sessions established between the server and the client nodes in this domain are inactive.

Figure 3:
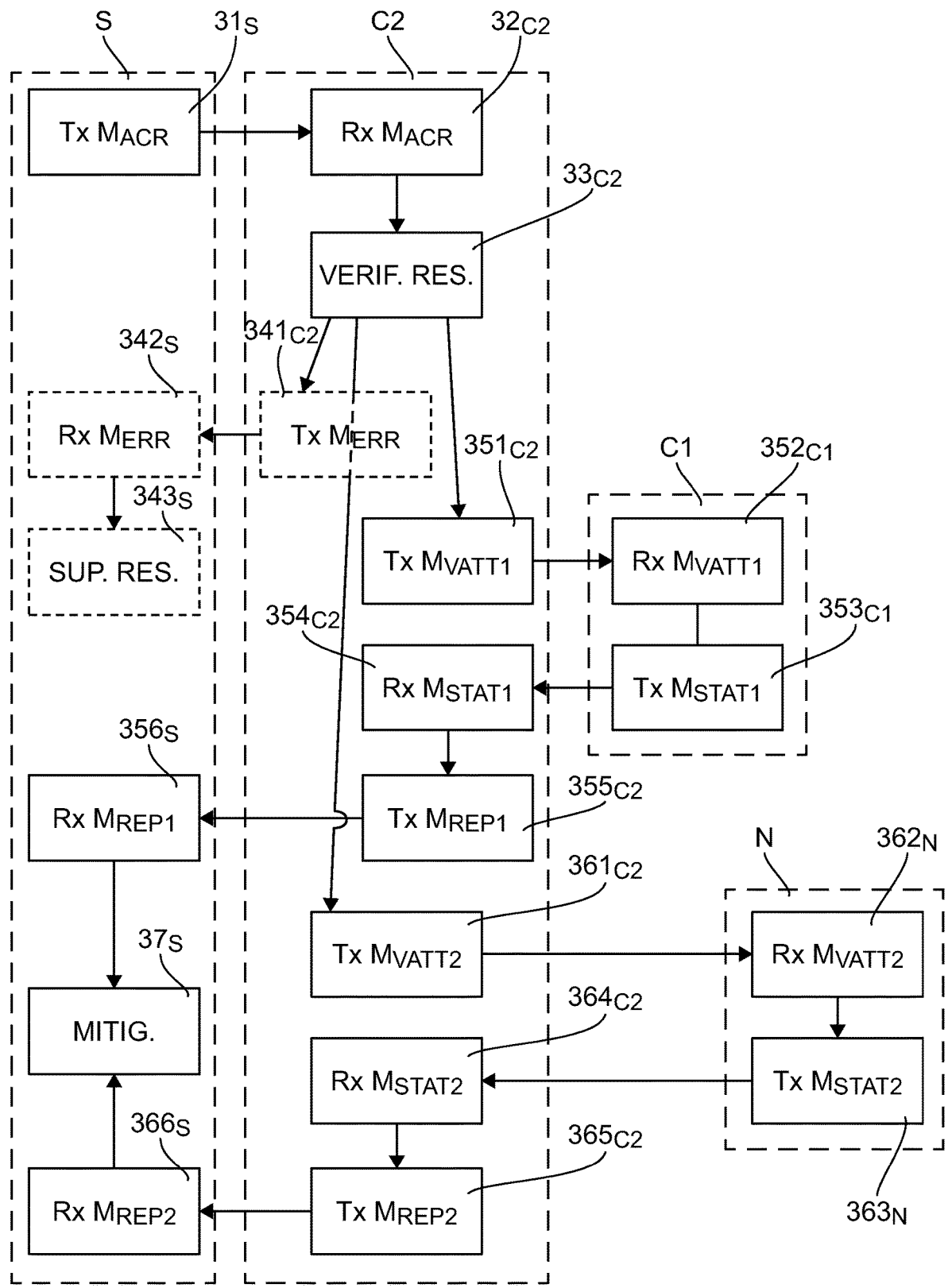
FIGS. 3 and 4 show two application examples of the invention.
Figure 4:
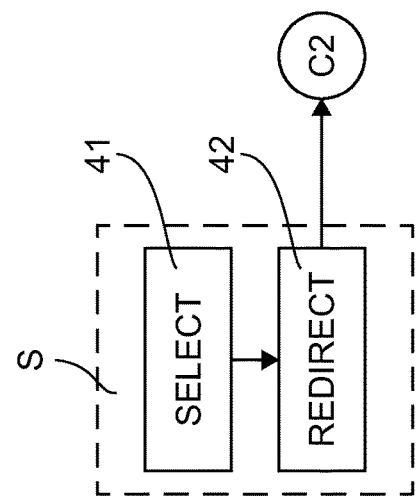

FIGS. 3 and 4 show two application examples of the inventions. According to the first application example, the action for managing the traffic implements the confirmation that an attack is in progress on at least one IP resource associated with the client domain. The first application example can therefore verify that a DDoS attack is effective before triggering a mitigation procedure. According to the second application example, the action for managing the traffic implements a redirection on the active node of at least part of the traffic associated with at least one IP resource of the client domain.

FIG. 3 shows the main steps of the method for managing traffic according to the first application example, According to this first application example, the action for managing the traffic implements the confirmation that an attack is in progress on at least one IP resource associated with the client domain. In particular, the traffic associated with an IP resource can be incoming traffic to an address extracted from this IP resource or outgoing traffic sent from that IP resource.

To do this, server 12 transmits ($31_S$) to the active client node 112, and possibly to all the active client nodes of the client domain, at least one attack confirmation request message for at least one IP resource associated with the client domain. For example, such a message is noted $M_{CAB}$ or "ATTACK_CONFIRMATION_REQUEST (Resources)". Note that the IP resources concerned may or may not be explicitly indicated in the message. For example, such a message specifies at least one IP resource, for example an IP resource associated with the failed client node 111 or client domain 11. The absence of an IP resource specification in such a message can be interpreted as a request to confirm an attack on all IP resources associated with the client domain.

In particular, such an IP resource belongs to the group comprising:

an IP address (for example, an IPv4 or IPv6 prefix), for example the IP addresses of the individual nodes of the client domain 11, an IP prefix (for example, an IPv4 or IPv6 prefix), e.g. an IP prefix associated with a connection router of the client domain 11, a domain name, for example a domain name associated with the client domain 11,
etc.

The active client node 112 then receives ($32_{C2}$) at least one attack confirmation request message concerning at least one IP resource associated with the failed client node 111, or more generally with client domain 11, from server 12.

The active client node 112 checks ($33_{C2}$) that the IP resource(s) identified in the attack confirmation request message(s) it receives are actually associated with the client domain 11.

If at least one IP resource identified in the attack confirmation request message(s) is not associated with the client domain, the active client node 112 transmits ($341_{C2}$) at least one error message to server 12. For example, such an error message is noted $M_{ERR}$ or "ERROR(Unknown_Resources)". In particular, such an error message may indicate the IP resource(s) that does not belong to the client domain 11.

Server 12 then receives ($342_S$) at least one error message from an active node, indicating that one or more IP resources identified in the attack confirmation request message do not belong to the client domain.

Server 12 can then delete ($343_S$) the IP resource(s) identified in the attack confirmation request message(s) or in the error message, of at least one table that it maintains.

If at least one IP resource identified in the attack confirmation request message(s) is associated with the client domain, several variants are possible.

According to a first variant, the active client node 112 transmits ($351_{C2}$) to at least one client node of the client domain associated with the IP resources identified in the attack confirmation request message. For example, such a first attack verification message is noted $M_{VATT1}$ or "DOTS_PEER_PROBE(Request_Code)". In particular, such a message is sent to the failed client node 111 to ask it to confirm/invalidate the attack.

The client node ($352_{C1}$) receiving this message $M_{VATT1}$, for example the failed client node 111, can respond to the active node, for example the active client node 112, by transmitting ($353_{C1}$) a first status message indicating whether an attack is in progress or not. For example, such a first status message is noted $M_{STAT1}$ or "DOTS_PEER_PROBE(Reply_Code)".

The active client node 112 receiving ($354_{C2}$) this first status message can then transmit ($355_{C2}$) to server 12 at least one first response message informing the server of the response to the first attack verification message. For example, such a first response message is noted $M_{REP1}$ or "ATTACK_CONFIRMATION_REPLY(Resources, Status)" and indicates the status (attack in progress or not), and the IP resource(s) concerned.

When server 12 thus receives ($356_S$) at least one first response message from at least one active node, it can trigger ($37_S$) a mitigation procedure on at least one IP resource associated with the client domain if at least one first response message confirms an attack.

According to a second variant, the active client node 112 transmits ($361_{C2}$), to at least one node of the client domain implementing an attack detection function, at least one second attack verification message relating to at least one IP resource associated with the client domain. For example, such a second attack verification message is noted $M_{VATT2}$ or "RESOURCE_PROBE(Rk)".

The node N receiving ($362_N$) this message can reply to the active node, for example the active client node 112, by transmitting ($363_N$) a second status message indicating whether or not an attack is in progress. For example, such a second status message is noted $M_{STAT2}$ or "RESOURCE_PROBE(code)".

The active client node 112 receiving ($364_{C2}$) this first status message can then transmit ($365_{C2}$) to the server 12 at least one second response message informing the server of the response to the second attack verification message. For example, such a second response message is noted $M_{REP2}$ or "ATTACK_CONFIRMATION_REPLY(Resources, Status)" and indicates the status (attack in progress or not), and the IP resource(s) concerned.

When server 12 thus receives ($366_S$) at least one second response message from at least one active node, it can trigger ($37_S$) a mitigation procedure on at least one IP resource associated with the client domain if at least one second response message confirms an attack.

According to a third variant, the first and second variants are implemented.

The active client node 112 therefore transmits at least one first attack verification message to at least one client node of the client domain (for example, to the client node(s) associated with the IP resources identified in the attack confirmation request message) ($351_{C2}$), and/or at least one second attack verification message to at least one client domain node implementing an attack detection function ($361_{C2}$), taking into account at least one selection criterion.

For example, the active client node chooses which node(s) (client node(s) or nodes enabling an attack detection function) it sends attack verification messages. The selection criterion is, for example, the volume of traffic passing through the neighbouring nodes of the active node.

Again, when server 12 receives at least one response message from said at least one active node (first and/or second response message(s)), it can trigger ($37_S$) a mitigation procedure on at least one IP resource associated with the client domain if at least one response message confirms an attack.

According to a particular embodiment, server 12 triggers ($37_S$) a mitigation procedure on at least one IP resource associated with the client domain, if no response to the attack confirmation request message is received for a predetermined period of time.

In relation to FIG. 4, the main steps of the method for managing traffic are now presented according to the second application example.

According to this second application example, the action for managing the traffic is a redirection, on the active node, of at least part of the traffic associated with an IP resource of the client domain. In particular, such an IP resource can be managed by the failed node.

Server 12 can implement, beforehand, a selection (41) of the part of the traffic to be redirected. For example, the selection belongs to the group comprising:
  a random selection,
  a selection of traffic from a source node using a number of network resources greater than or equal to a predetermined number, e.g. the majority of network resources;
  a selection of traffic associated with an IP resource of the client domain (i.e. incoming traffic to an address extracted from that IP resource or outgoing traffic sent from that IP resource) using a number of network resources greater than or equal to a predetermined number, e.g. the majority of network resources.

As already mentioned, the traffic to be managed incoming traffic to an address extracted from an IP resource or outgoing traffic sent from that IP resource. The following is placed in the context of the management of incoming traffic on the client domain.

The server then directs the selected portion of the traffic to the active node, for example, node 112. For example, redirection is implemented for a pre-determined period of time.

Thus, upon detection of a communication problem between the server and a client node, for example node 111, server 12 redirects some traffic, initially routed through a path passing through the failed client node, to secondary paths passing through one or more client nodes in the same client domain that have an active session with the server.

Eventually, the active node(s) may trigger a mitigation procedure if it (they) find(s) that the traffic on this active node is illegitimate traffic, i.e., corresponds to a DDoS attack.

According to another embodiment, which can be combined with one of the application examples presented above, the method of managing the traffic associated with a client domain comprises the verification of the fact that all the client nodes of the client domain have previously agreed to implement the steps described above which concern them, and particularly the steps of detecting a communication problem between the server and a first client node of the client domain, identifying at least one second client node of the client domain, and verifying that at least one session associated with this second client node is active.

In particular, the verification that all client nodes of the client domain have previously agreed to the implementation of the method for managing traffic implements checking the value of a mitigation trigger parameter, noted for example "trigger-mitigation", associated with each client node of the client domain during a configuration negotiation phase. For example, the value of the mitigation trigger parameter "trigger-mitigation" must be equal to "FALSE".

Furthermore, in combination with one of the above application examples, the action for managing the traffic can be terminated if the server receives a message from the failed node. Receiving such a message from the failed node means that the session between the server and the failed node is active again. The latter can possibly command a mitigation action if necessary.

5.2 Application Examples in the Domain of Mitigation Services (DPS)

Embodiments of the invention in a DOTS-type architecture are described below, according to which the client nodes C1 111, C2 112, C3 113 and Cm 114 are DOTS clients and the server S 12 is a DOTS server. The client nodes C1 111, C2 112, C3 113, Cm 114 and the server S 12 can thus communicate via the DOTS signal and data channels defined in connection with the prior art to inform the server that the client domain is under DDoS attack and that appropriate actions are required.

5.2.1 Reminders of DOTS Architecture

A DOTS request can be, for example:
an alias management message, for example to associate an identifier with one or more network resources located of the client domain,
a signalling message to request mitigation of a denial of service attack from a DOTS server, with the server being able, upon receipt of such a message, to initiate the actions necessary to stop the attack,
a filter rule management message, such as soliciting a DOTS server to install (or have installed) an Access Control List (ACL).

A DOTS request can be sent from a DOTS client, belonging to a DOTS client domain, to a DOTS server or to a plurality of DOTS servers.

A DOTS domain can support one or more DOTS clients. In other words, several client nodes in a client domain can have DOTS functions.

DOTS communications between a client domain and a server can be direct, or established via DOTS gateways. These gateways can be hosted within the client domain, the server domain, or both. In other words, a node of the client domain can communicate directly with the server, or transmit a request to a gateway of the client domain that communicates directly with the server or to a gateway in the server domain, or transmit a request to a gateway in the server domain that communicates with the server.

A DOTS gateway located in a client domain is considered by a DOTS server as a DOTS client.

A DOTS gateway located in a server domain is considered by a DOTS client as a DOTS server. If there is a DOTS Gateway in a server domain, the authentication of DOTS clients can be entrusted to the DOTS Gateway of the server domain. A DOTS server can be configured with the list of active DOTS gateways within its domain and the server can delegate some of its functions to these trusted gateways. In particular, the server can securely use the information provided by a gateway on a list declared to and maintained by the server by means of an ad hoc authentication procedure (for example, explicit configuration of the list by the authorised administrator of the server, retrieval of the list from an authentication server such as an AAA server (for "Authentication, Authorisation and Accounting"), etc.).

The embodiments presented below can be implemented regardless of the configuration of the DOTS architecture (one or more DOTS clients in a client domain, no DOTS gateway, one or more DOTS gateways of the client domain or in the server domain, client domain separate from the server domain, etc.).

The establishment of a secure DOTS session can be done in accordance with the procedure described in the above-mentioned document "*Distributed Denial-of-Service Open Threat Signaling (DOTS) Signal Channel Specification*". For example, sessions can be established using a procedure described in one of the following documents:

"*Datagram Transport Layer Security Version 1.2*", Rescorla E. et al, RFC 6347, DOI 10.17487/RFC6347, January 2012, "*The Datagram Transport Layer Security (DTLS) Protocol Version 1.3*", Rescorla E. et al, draft-ietf-tls-dtls13-22, November 2017, "*The Transport Layer Security (TLS) Protocol Version 1.2*", Dierks T. et al, RFC 5246, DOI 10.17487/RFC5246, August 2008, "*The Transport Layer Security (TLS) Protocol Version 1.3*", Rescorla E., draft-ietf-tls-tls13-23, January 2018.

In the following, it is assumed that the DOTS agents (client(s), server(s)) authenticate each other. There is therefore a secure communication channel, for example of the type (D)TLS, between a DOTS client and a DOTS server.

Thus, messages received from another server impersonating the legitimate server can be rejected by a DOTS client. Similarly, requests from DOTS clients not authorised to access the mitigation service can be ignored by the DOTS server. It is assumed in what follows that this procedure is put in place by DOTS agents.

The details of (D)TLS exchanges, and those concerning the management of security keys for mutual authentication of DOTS agents, are not the subject of the present invention and are not detailed here.

The various steps implemented by a DOTS client and a DOTS server are presented below, with reference to FIGS. 1 to 4. As an example, client nodes 111 to 114 in FIG. 1 are considered to be DOTS clients and server 12 in FIG. 1 is considered to be a DOTS server. The client domain is therefore a DOTS domain.

5.2.2 First Application Example: Cooperative Automatic Mitigation Procedure Upon Detection of Signal Loss A first application example of the invention is presented below in more detail, according to which the action for managing the traffic implements the confirmation that an attack is in progress on at least one IP resource associated with the client domain.

This first application example can therefore verify that a DDoS attack is effective before triggering a mitigation procedure, and therefore offers a solution to avoid the unnecessary triggering of mitigation operations.

As described below, the detection of a DDoS attack within a client domain can be performed by a DOTS client itself and/or by a dedicated function called DDoS Detector. One or more DDoS detectors can be activated per DOTS domain.

Figure 5:
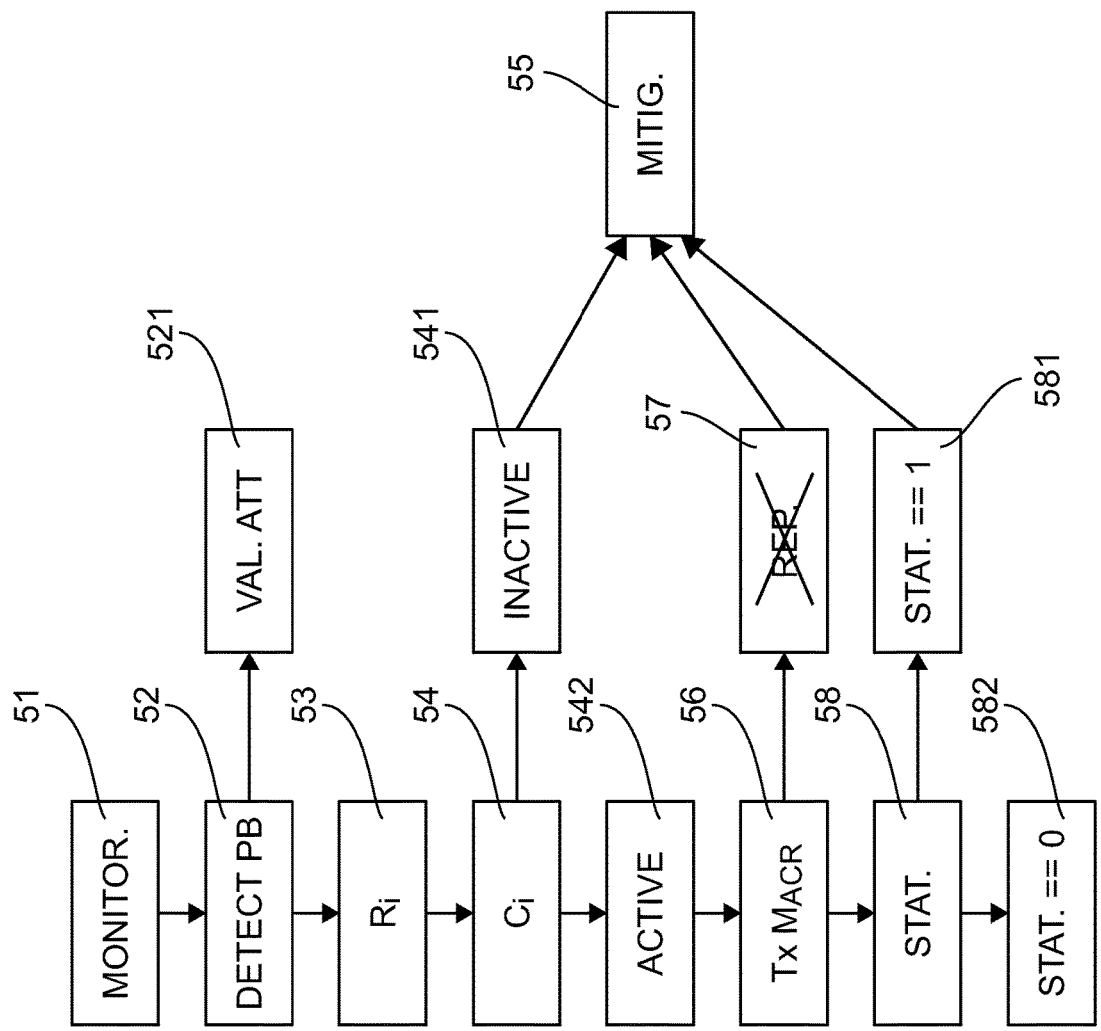
FIG. 5 shows the main steps implemented by a DOTS server according to a first application example of the invention.

As shown in FIG. 5, during a "monitoring" step 51, the DOTS server monitors the status of connections with DOTS clients, or more generally monitors DOTS sessions, i.e. the signal channel connections established between the DOTS server and DOTS clients.

If a communication problem with a first DOTS client is detected during a step 52, for example a prolonged signal loss, the DOTS server does not automatically trigger the mitigation procedure, but triggers a procedure to confirm that a DDoS attack is indeed in progress. For example, a communication problem is detected when the server does not receive, for a predetermined period Th, presence messages from the first DOTS client, for example messages of the "heartbeat" type.

In this case, status 521 associated with this failed DOTS client in the server's status tables can be "ATTACK_TO_BE_VALIDATED".

In step 53, the server obtains a list of at least one IP resource associated with the failed DOTS client, or more generally the client domain.

As already mentioned, IP resources can be IP addresses, IP prefixes or domain names. Domain names can be resolved to IP addresses. The IP prefixes below denote IP prefixes directly communicated by a DOTS client or addresses retrieved via a name resolution system (e.g. DNS). The prefixes can be of the same address family or belong to distinct families (IPv4, IPv6).

The "ATTACK_TO_BE_VALIDATED" status thus indicates that the IP resources associated with the failed DOTS client, or more generally the client domain, may be under a DDoS attack.

The server also obtains, during a step 54, a list of at least one second DOTS client belonging to the same domain as the failed DOTS client, and verifies if this or these second DOTS client(s) are active, i.e. if a DOTS session is active between the server and at least one of these second DOTS clients. The server can also identify IP resources associated with active DOTS clients.

If all sessions are inactive (541), that is, if no presence messages, for example of the "heartbeat" type, are received during a period Th for all identified DOTS clients of the domain, the DOTS server can initiate mitigation operations (55) for all IP resources associated with this domain. The status of the failed client as maintained by the server can then be changed to "MITIGATION_IN_PROGRESS".

Alternatively, the server may decide that an attack is in progress if most sessions with DOTS clients of the client domain are inactive. A trigger threshold is used for this purpose by the server. For example, this threshold may be 50% or 75% of the DOTS sessions established with clients in this domain. Hence, if more than half of the sessions between the server and the DOTS clients of the domain are inactive, the server can decide to trigger the mitigation procedure. Of course, other values may be used by the server.

If at least one DOTS session is active (542) between the server and a DOTS client, the server can send, during a step 56, an unsolicited attack confirmation request message ($M_{ACR}$ or "ATTACK_CONFIRMATION_REQUEST(Resources)") to at least one active DOTS client of the domain.

Such a message has at least one IP resource associated with the failed DOTS client, or the client domain to which the failed DOTS client belongs. For example, the special value "ANY" can be used to indicate that this is any IP resource associated with the client domain.

When this message is sent, the status of the failed DOTS client, as maintained by the server, changes to "WAITING_FOR_CONFIRMATION", for example.

When an active DOTS client of the client domain receives such an attack confirmation request from the server, the active DOTS client implements an initial verification phase in which it can proceed to the security checks to verify the identity of the server and can validate that the IP resources associated with the attack confirmation request message are effectively associated with the client domain.

The request can be ignored by the active client if the security checks fail, and the active client may not send a response to the server making the request.

If no response to the attack confirmation request message is received by the server after a predetermined time Tc (57), the state of the failed client may be changed to "VALIDATION_TIME_OUT" in the status table(s) maintained by the server.

The DOTS server can then initiate mitigation operations 55 for all IP resources associated with that client domain, and the state of the failed client as maintained by the server can be changed to "MITIGATION_IN_PROGRESS".

Alternatively, if at least one IP resource specified in the attack confirmation request message is not associated with the client domain, the active client can send an error message ($M_{ERR}$ or "ERROR(Unknown_Resources)") to the server to inform it. Such a message lists, among other things, the IP resources present in the attack confirmation request message that are not associated with the client domain.

When the error message is received by the server, the server retrieves the IP resources specified in the error message and removes the active statuses associated with those resources.

Figure 6:
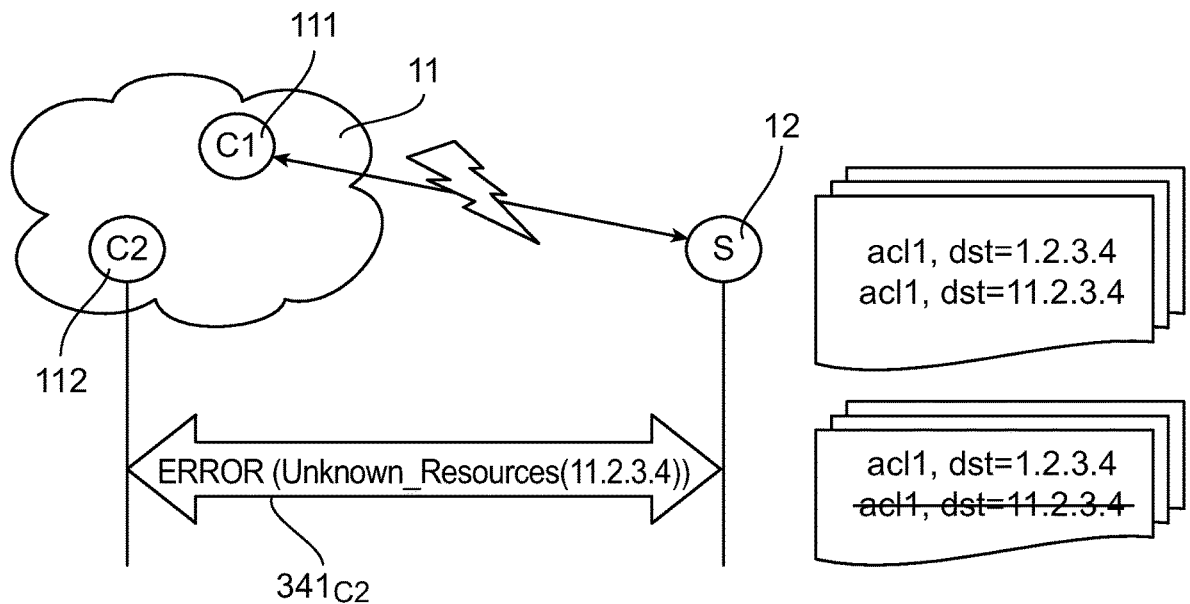
FIG. 6 shows the deletion of IP resources from tables maintained by the server that are no longer associated with a client domain.

For example, as shown in FIG. 6, the session between client C1 111 and server S 12 is inactive. However, the session between the client C2 112 and the server S 12 is active. The server can therefore send an attack confirmation request message to the C2 client 112, including IP addresses 1.2.3.4 and 11.2.3.4. C2 client 112 verifies that these addresses belong to client domain 11, and sends ($341_{C2}$) an error message to server 12 to inform it that the IP address 11.2.3.4 is not associated with the client domain. Server 12 can then remove filter rules associated with IP address 11.2.3.4, or more generally filter rules associated with resources not belonging to the client domain. This procedure eliminates obsolete entries ("stale").

At the end of this first verification phase, the active client 112 can proceed to a second verification phase to confirm/invalidate if an attack targets the resource(s) indicated in the attack confirmation request message.

In other words, in addition to the first phase of local verification to check whether the IP resources indicated in the attack confirmation request message are associated with the client domain, and particularly managed by the active client, other verification modalities, which are not mutually exclusive, may be adopted by the active client to conclude whether or not an attack is in progress.

At the end of this second phase of verification, detailed below in relation to FIGS. 7A to 7D, the active client 112 can indicate (58) to the server whether or not an attack is in progress on one or more IP resources. For example, the active client 112 sends the server a response message (ATTACK_CONFIRMATION_REPLY (Resources, Status)) comprising two parameters:
the "Resources" parameter, which indicates the relevant IP resource(s), and
the "Status" parameter, which is set, for example, to "1" if an attack is in progress or to "0" otherwise.

If the "Status" parameter is set to "1" (581), this means that an attack is in progress on at least one IP resource associated with the attack confirmation request message, and the server proceeds to launch mitigation operations 55 for the IP resources concerned, or failing that, for all the IP resources associated with the client domain.

The status of the failed client as maintained by the server can be changed to "ATTACK VALIDATED" and then "MITIGATION_IN_PROGRESS".

If the server receives several response messages from different clients of the domain, for example, the server determines that an attack is in progress if at least one of these clients sends a response message with the "Status" parameter set to "1".

If the "Status" parameter is set to "0" (582) in all responses received, this means that no attack is in progress, and the server does not need to activate a mitigation procedure.

The status of the failed client as maintained by the server can be changed to "ATTACK VALIDATED" and then "IDLE".

It should also be noted that if the DOTS server receives a message from the failed client, the verification procedure (according to the first or second phase) is interrupted. This client's status can then be changed to "IDLE".

The following are three variants for implementing the second phase of verification, confirming or denying whether an attack is targeting the resource(s) indicated in the attack confirmation request message and identified as belonging to the client domain.

It is assumed here, as an example, that the domain clients are preconfigured with the list of other domain clients, as well as the list of IP resources associated with each client.

Figure 7A:
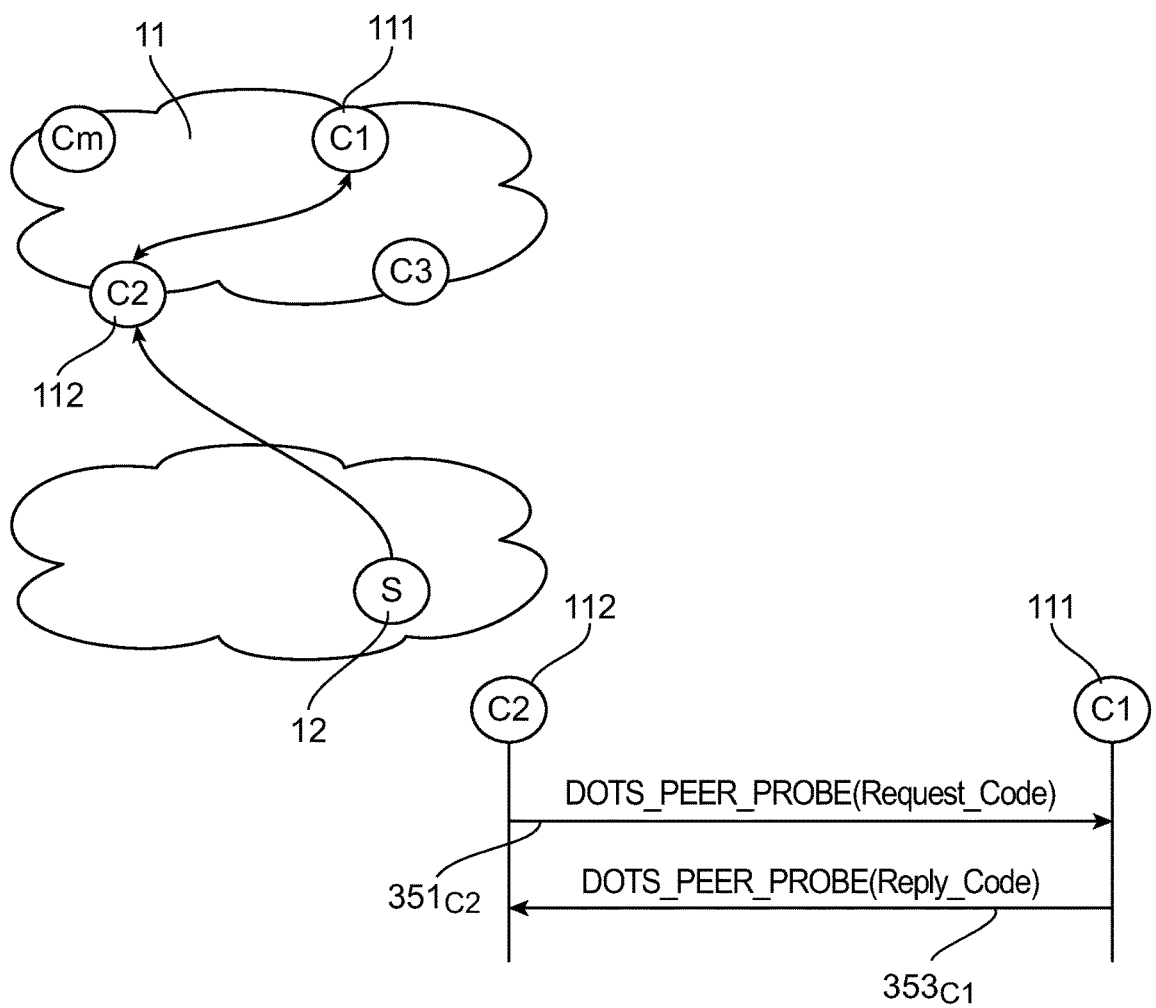
FIGS. 7A to 7D show different variants for the implementation of a second verification phase to confirm/invalidate if an attack is targeting IP resources.

In a first variant, illustrated in FIG. 7A, the active DOTS client 112 directly contacts the DOTS client responsible for managing the resources indicated by the server, for example the failed client 111 if the attack confirmation request message has at least one IP resource associated with the failed DOTS client, or a DOTS entity responsible for managing the client domain if the attack confirmation request message has the special value "ANY" (used to indicate that it is any IP resource associated with the client domain).

For example, active client 112 sends ($351_{C2}$) at least a first attack verification message ($M_{VATT1}$ or "DOTS_PEER_PROBE(Request_Code)") to at least one client node of the client domain associated with the IP resources identified in the attack confirmation request message, for example the failed client 111.

For example, this first attack verification message is transmitted from the active client 112 to the failed client 111 to request it to confirm/invalidate the attack.

The "Request_Code" field in the first verification message can be used to indicate the nature of the request, for example:
"0": life detection message of failed client 111, i.e. is this client 111 still active in the domain;
"1": asks if the failed client 111 is aware of an attack on a given resource; in this case, the first check message may include a list of resources for which to check if an attack is in progress.

The failed client 111 may possibly respond ($353_{C1}$) to this first attack verification message with a first status message ($M_{STAT1}$ or "DOTS_PEER_PROBE(Reply_Code)") indicating whether or not an attack is in progress.

The "Reply_Code" field in the first status message can be used to indicate the nature of the response, for example:
"0": no attack is in progress;
"1": confirmation of the attack.

The active 112 client can then send the server a first response message ($M_{REP1}$ or "ATTACK_CONFIRMATION_REPLY(Resources, Status)") indicating the status (the "Status" parameter is set to "1" if an attack is in progress or to "0" otherwise) and the IP resource(s) concerned by the current attack.

Figure 7B:
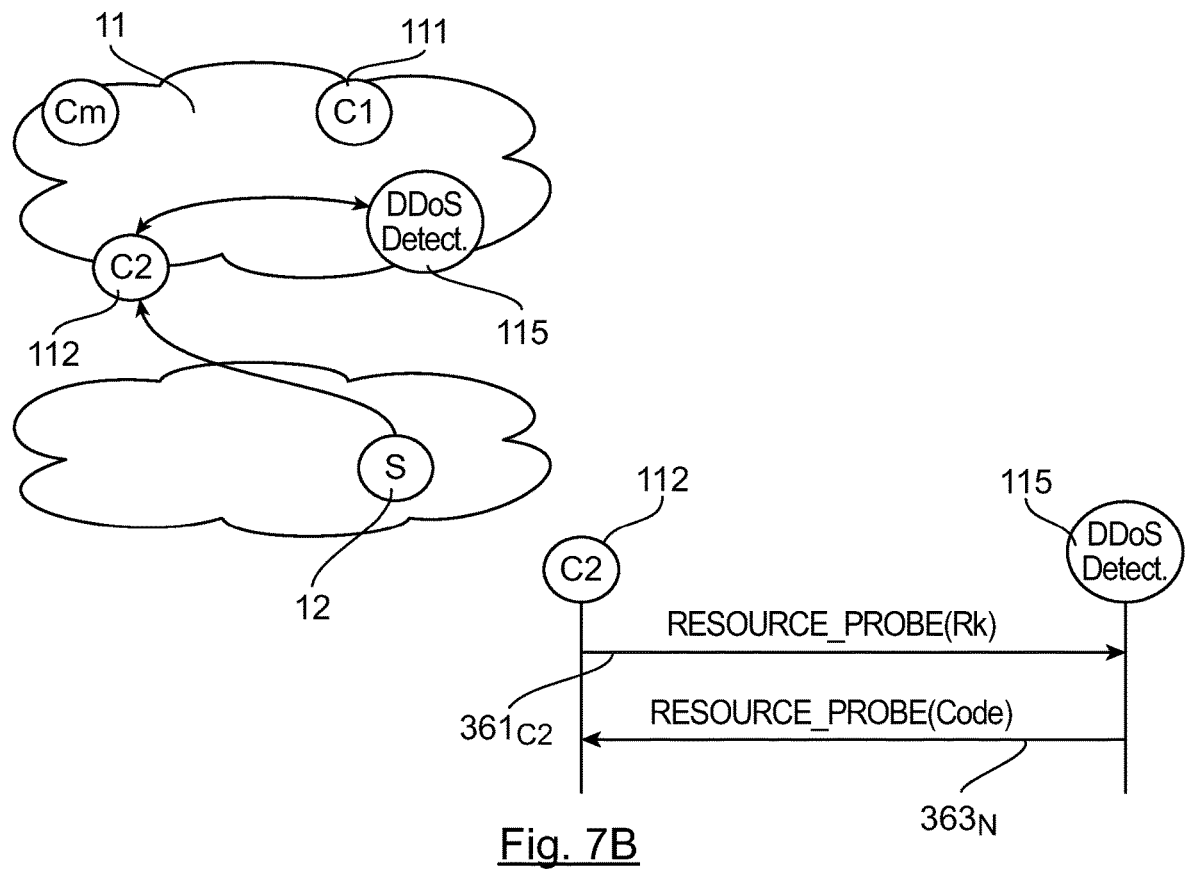

In a second variant, illustrated in FIG. 7B, the active DOTS client 112 contacts a DDoS attack detection function used within the client domain. Such a function is, for example, implemented in at least one node N in client domain 11, also known as a DDoS detector.

For example, active client 112 sends ($361_{C2}$) at least one second attack verification message ($M_{VATT2}$ or "RESOURCE_PROBE(Rk)") to the DDoS detector 115 to request to confirm/invalidate an attack targeting at least one resource.

The "Rk" field of the second attack verification message can be used to specify the list of resources involved:
"ANY" or empty field: if it is necessary to check whether an attack is in progress on all IP resources of the client domain; or
an explicit list of IP resources for which to verify if an attack is in progress.

The DDoS attack detection function, or the node N 115 activating this function, may possibly respond ($363_N$) to this second attack verification message with a second status message ($M_{STAT2}$ or "RESOURCE_PROBE(Code)") indicating whether or not an attack is in progress.

The "Code" field in the second status message can be used to indicate the nature of the response, for example:
"0": no attack is in progress;
"1": confirmation of the attack.

The active 112 client can then respond to the server with a second response message ($M_{PEER2}$ or "ATTACK_CONFIRMATION_REPLY(Resources, Status)") indicating the status (the "Status" parameter is set to "1" if an attack is in progress or to "0" otherwise) and the IP resource(s) concerned.

Figure 7C:
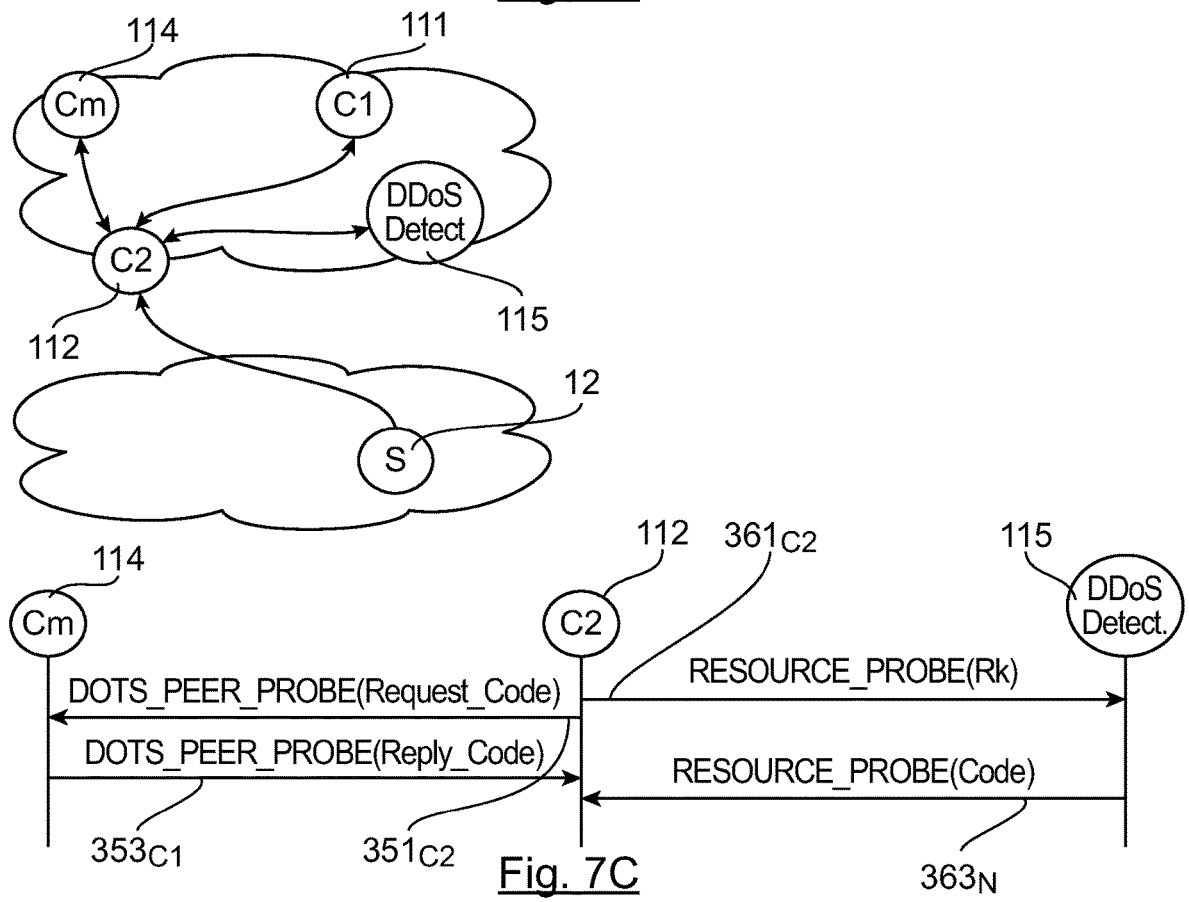

According to a third variant, illustrated in FIG. 7C, combining the first and second variants, the active DOTS client 112 may contact a DDoS attack detection function used within the client domain and/or one or more DOTS clients, active or not, and not necessarily responsible for managing the resources indicated by the server in the attack confirmation request message.

The messages exchanged between the active DOTS client 112 and one or more DOTS clients are similar to those described in connection with the first variant and are not described in more detail. The messages exchanged between the active DOTS client 112 and the DDoS attack detection function are similar to those described in connection with the second variant and are not described in more detail.

Possibly, the active 112 client can distribute attack verification requests between clients and the DDoS detector according to the activity considerations of neighbouring clients, for example.

The active 112 client can then send a response message to the server indicating the status (the "Status" parameter is set to "1" if an attack is in progress or to "0" otherwise) and the IP resource(s) concerned. Under this third variant, the active client 112 decides that an attack is in progress if it receives at least one response confirming the attack, and consequently informs the server.

Possibly, the active client 112 can send multiple response messages to the server. In this case, the server decides that an attack is in progress if it receives at least one response confirming the attack.

Figure 7D:
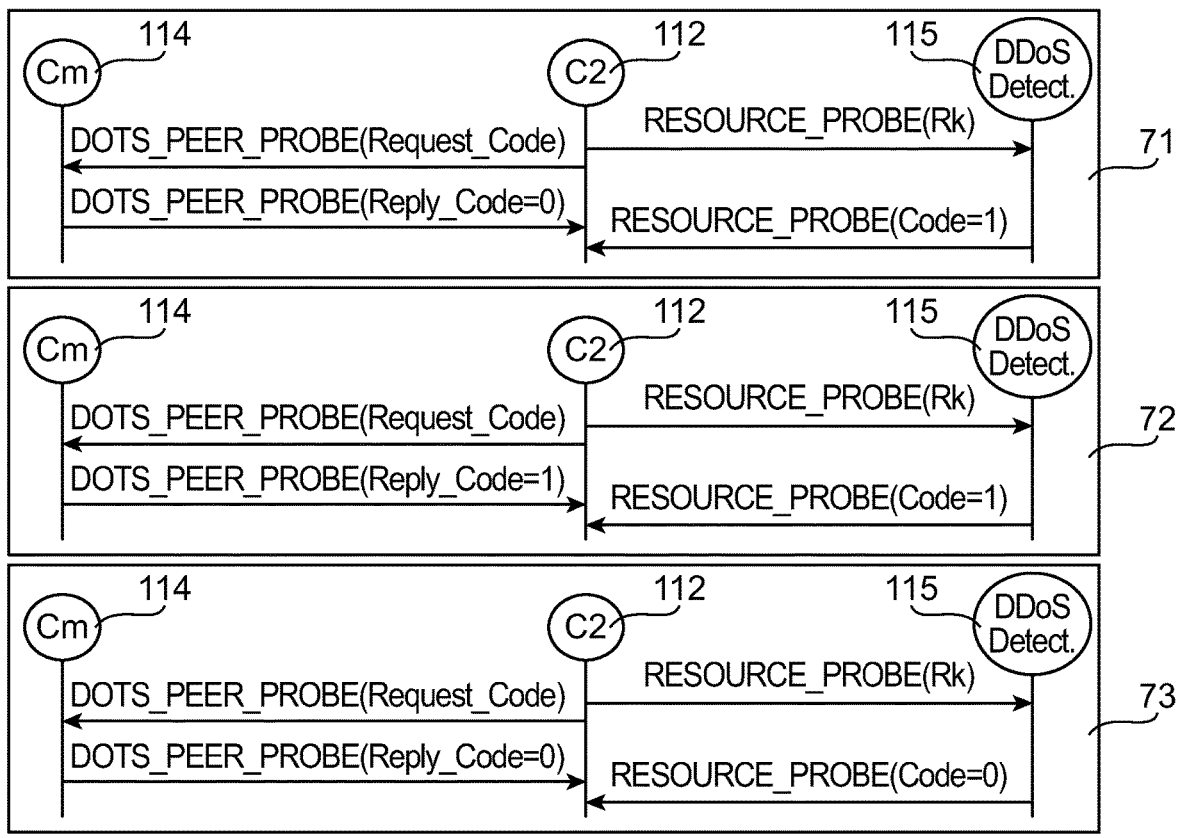

FIG. 7D shows three examples of messages exchanged between the active DOTS client 112, the DDoS detector 115, and the Cm client 114.

According to the first example 71, the first status message indicates that no attack is in progress (DOTS_PEER_PROBE(Reply_Code=0)) and the second status message indicates that an attack is in progress (RESOURCE_PROBE (Code=1)). In this case, the active DOTS client 112 concludes that an attack is in progress.

According to the second example 72, the first status message indicates that an attack is in progress (DOTS_PEER_PROBE(Reply_Code=1)) and the second status message indicates that no attack is in progress (RESOURCE_PROBE(Code=0)). In this case, the active DOTS client 112 concludes that an attack is in progress.

According to the third example 73, the first status message indicates that no attack is in progress (DOTS_PEER_PROBE(Reply_Code=0)) and the second status message also indicates that no attack is in progress (RESOURCE_PROBE (Code=0)). In this case, the active DOTS client 112 concludes that no attack is targeting the resource specified in the request.

Note that the various messages exchanged between the DOTS server and DOTS clients can use the DOTS signal and data channels presented in relation to the prior art.

5.2.3 Second Application Example: Soliciting Other DOTS Clients in the Field

A second example of an application of the invention, where the action for managing the traffic implements a redirection on the active node of at least part of the traffic associated with the domain, is presented in more detail below.

Figure 8:
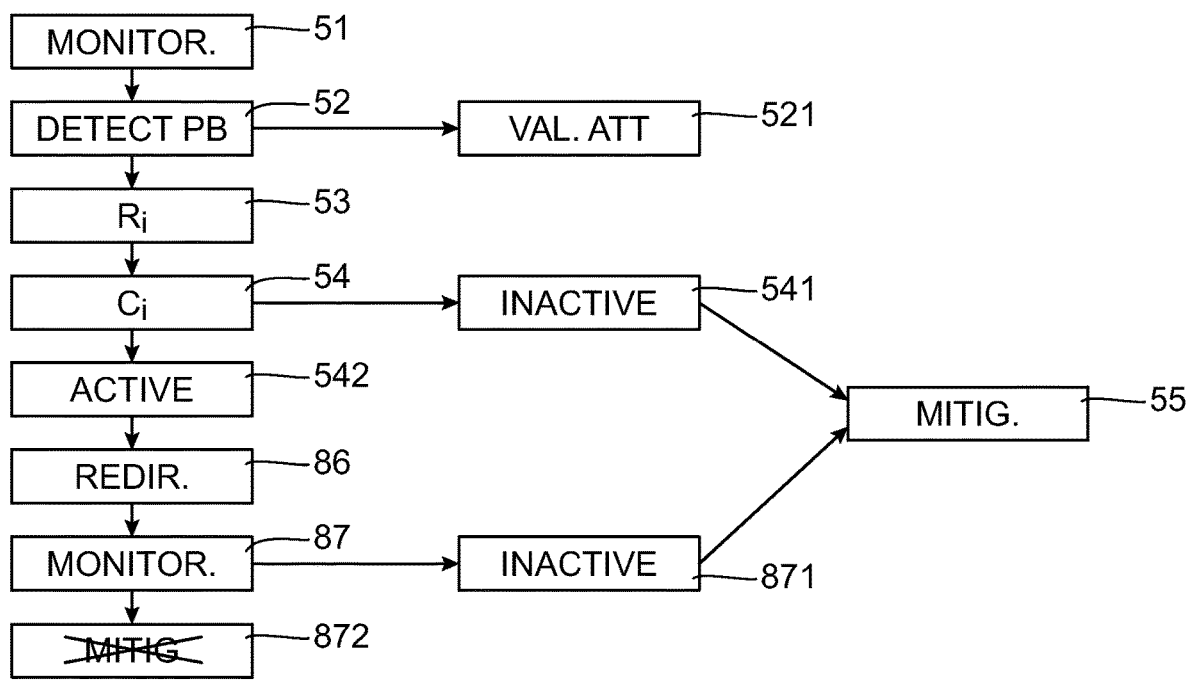
FIG. 8 shows the main steps implemented by a DOTS server according to a second application example of the invention.

FIG. 8 illustrates the main steps implemented to redirect part of the traffic to an active client.

The monitoring steps 51 of DOTS clients belonging to a client domain, detecting a communication problem with a first DOTS client 52, obtaining at least one IP resource associated with this failed client 53, obtaining at least one second client belonging to that client domain 54, and mitigation 55 are similar to those presented in relation to FIG. 5 and are not described in more detail.

In particular, if DOTS clients belonging to the same domain have been identified by the server, the server checks that DOTS sessions are active with at least one of these clients.

If all DOTS sessions are inactive (541), for example no presence messages, of the "heartbeat" type are received during a period Th for all clients of the domain, the DOTS server initiates mitigation operations 55 for all resources associated with this domain.

If at least one DOTS session with a client of the client domain is active (542), the server may, upon detection of a communication problem with a DOTS client (loss of signal for example) redirect (86) part of the traffic, initially routed through the path involving the failed DOTS client, to secondary paths involving one or more DOTS clients of the same domain whose DOTS session is active.

According to a particular embodiment, the selection of the traffic to be redirected may be based on one or more selection criteria, belonging to the group comprising:
random selection,
selection of the traffic from a given source consuming the majority of network resources (L1),
selection of the traffic to a given machine consuming the majority of network resources (L1),
etc.

If some of the traffic is actually associated with a DDoS attack, one or more of the DOTS clients requested when redirecting the traffic can send a signal to the server asking it to initiate mitigation operations.

For example, the redirection can be programmed for a predetermined REDIRECT_Tmax period. Thus, the DOTS server monitors (87) the inactive session with the failed DOTS client for a predetermined REDIRECT_Tmax period.

If, at the end of this predetermined REDIRECT_Tmax period, the server receives a mitigation request or if the previously active session(s) are no longer active (871), the DOTS server can initiate mitigation operations 55 for all resources associated with this client domain.

If, at the end of this predetermined REDIRECT_Tmax period, the server does not receive any mitigation request (872), and if at least one session with another DOTS client is still active, this means a priori that the communication problem with the failed client is not due to a DDoS attack, and the status associated with the failed DOTS client can be set to "IDLE" in the status table(s) maintained by the server.

The server may also decide to redirect another portion of the traffic and repeat the same procedure for another REDIRECT_Tmax period.

Figure 9:
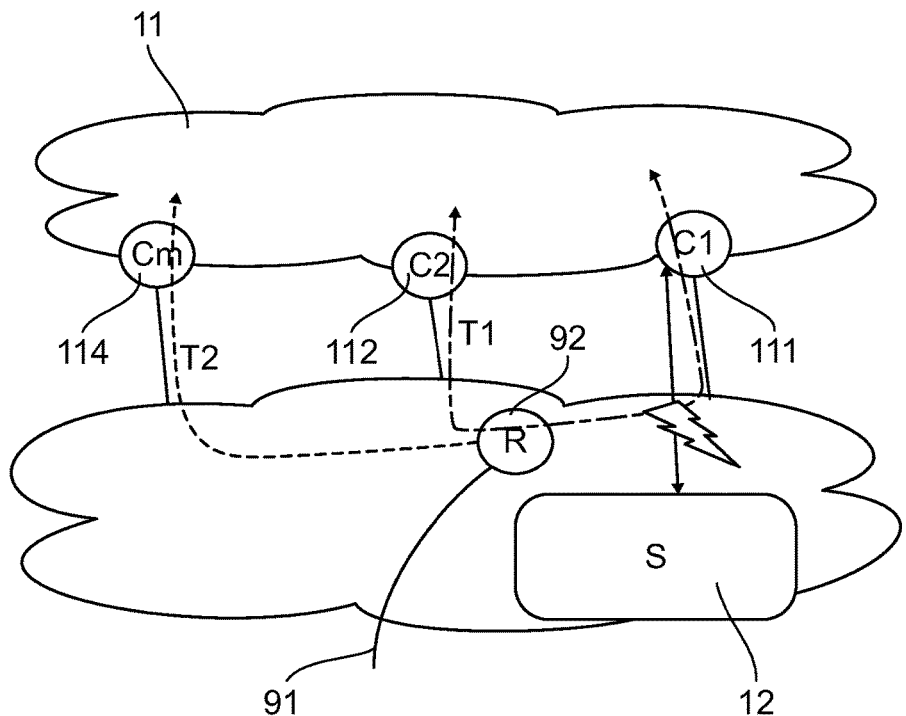
FIGS. 9 to 12 show different examples of traffic redirection according to the second application example of the invention.

According to the example shown in FIG. 9, a communication problem is detected between server 12 and client C1 111. Part of the incoming traffic 91 is redirected, thanks to a router R 92 for example, to the active client C2 112 for a REDIRECT_Tmax period equal to T1. At the end of this period, another part of the incoming traffic 91 may be redirected to the active Cm 114 client for a REDIRECT_Tmax period equal to T2.

Figure 10:
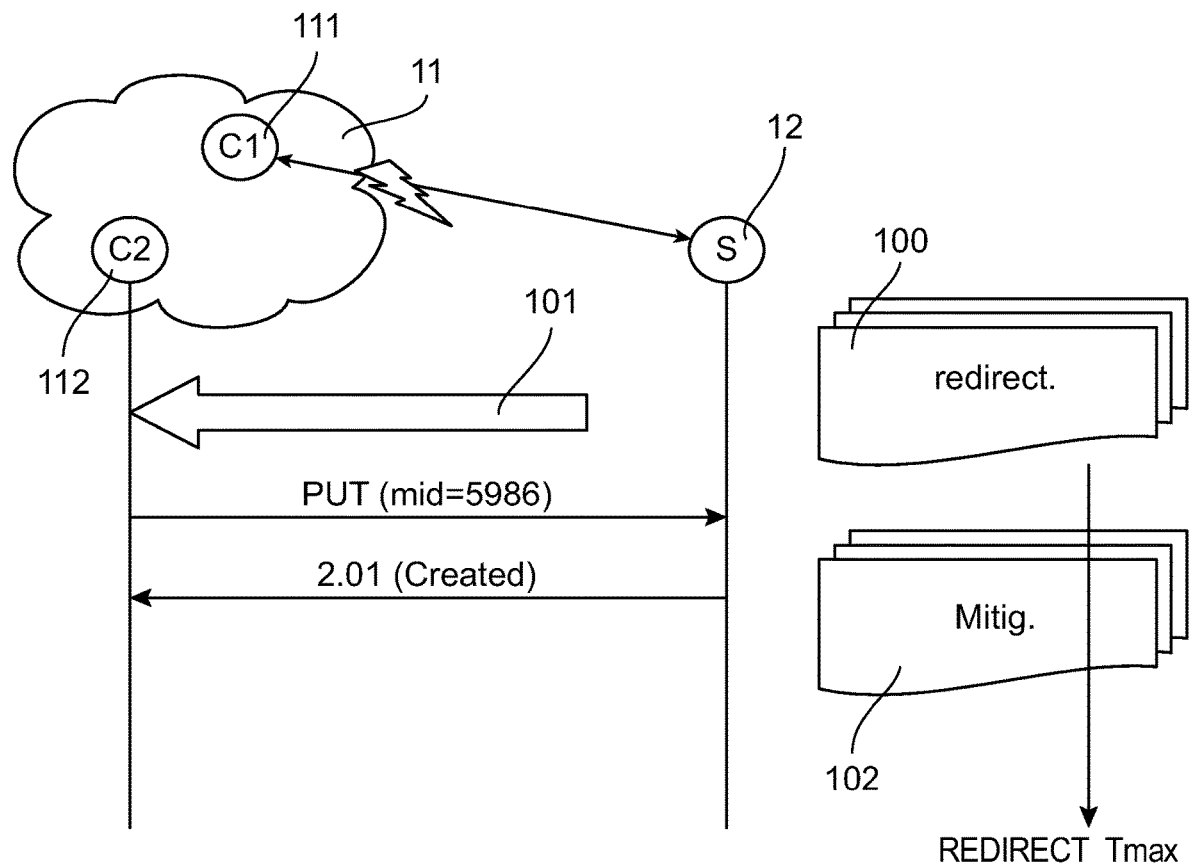

According to the example shown in FIG. 10, a communication problem is detected between server 12 and client C1 111. Part of the incoming traffic is redirected (100) to another active client. Once the traffic is redirected to other paths, the server triggers the REDIRECT_Tmax timer. The client C2 112 can intercept redirected traffic (101), in particular if the redirected traffic transits through the client C2 112, and detect a DDoS attack in the incoming traffic before expiry of the predetermined REDIRECT_Tmax period. The client C2 112 can then ask the DOTS server to initiate a mitigation procedure (for example by using the PUT(mid=5986) message). The server can then trigger the DDoS mitigation operations (102) and inform the active client C2 112 (2.01 (Created)).

Figure 11:
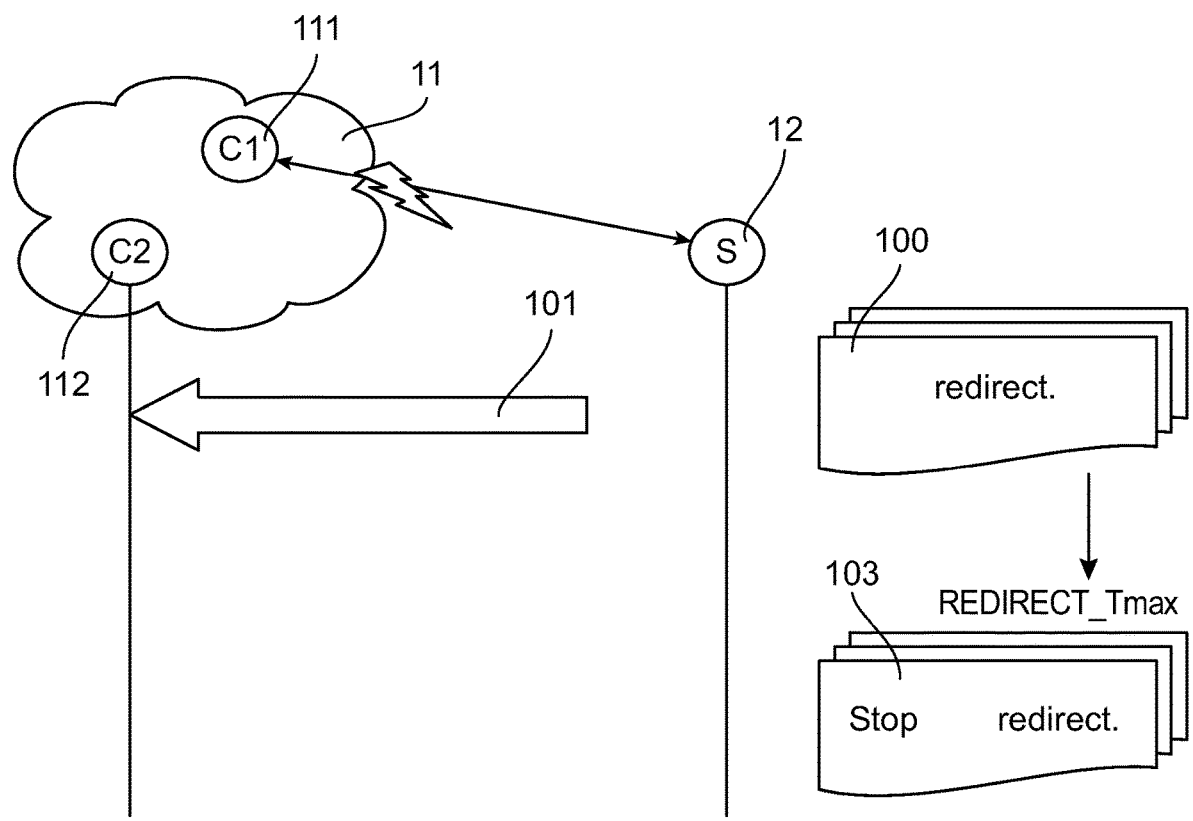

According to the example shown in FIG. 11, a communication problem is detected between server 12 and client C1 111. Part of the incoming traffic is redirected (100) to another active client. Once the traffic is redirected to other paths, the server triggers the REDIRECT_Tmax timer. The client C2 112 can intercept redirected traffic (101), in particular if the redirected traffic transits through the client C2 112. If no mitigation request is received by the server from the client C2 112, and the DOTS session is still active with this client C2 112, the server concludes that no attack is in progress. The server can then decide to stop the traffic redirection (103).

Based on the examples shown in FIGS. 10 and 11, it is assumed that, by construction of the DOTS service, DOTS clients are activated on interconnection routers. However, this is only one embodiment.

Figure 12:
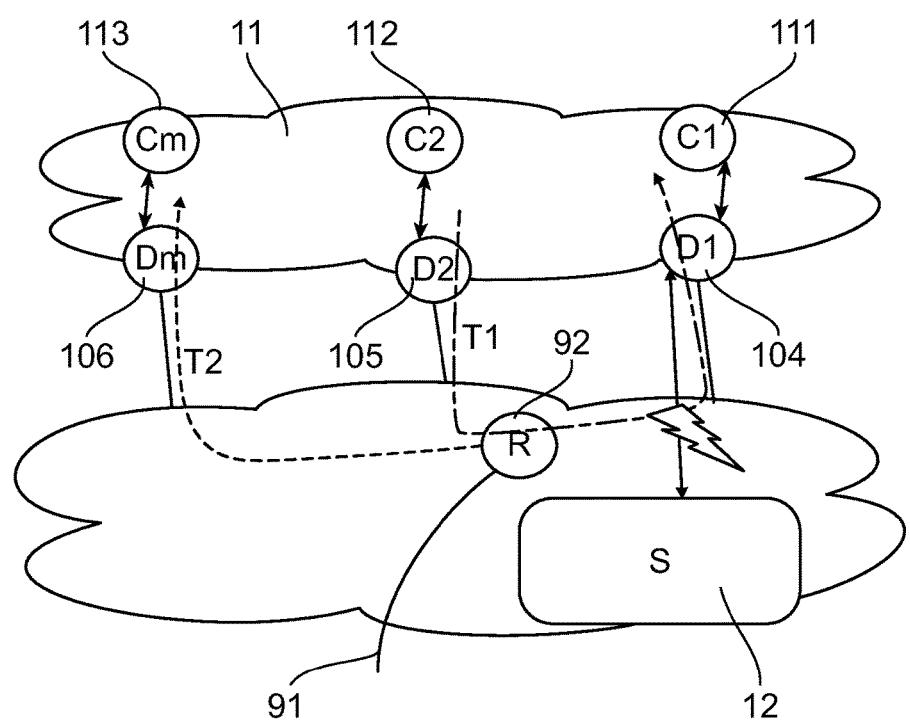

The proposed technique can also be implemented when clients are activated in other nodes. The DOTS clients are therefore not necessarily located on the path taken by incoming and/or outgoing traffic. In this case, as shown in FIG. 12, DDoS detectors (D1 104, D2 105, . . . , Dm 106) can be activated to monitor the traffic flowing through the various interconnection links of the client domain. Attack detection can then be implemented by one of these detectors, which can communicate the information to the associated DOTS client.

In particular, the S 12 server can communicate with the DDoS detectors via the DOTS signal and data channels defined in connection with the prior art.

5.2.4 Detecting Conflicts Between Several Clients of the Same Domain

Moreover, according to at least one embodiment, the method for managing traffic associated with a client domain includes the verification of a parameter common to the client nodes, notably making it possible to ensure the consistency of the configuration of the different clients of a same domain with regard to the activation of the automatic mitigation on loss of the DOTS signal.

Hence, under this implementation, a server may only enable the procedure described above if all clients of a same domain have negotiated the same value for the "trigger-mitigation" mitigation trigger parameter during the DOTS session configuration negotiation. The server must therefore check the value of this mitigation trigger parameter.

As an example, it is assumed that client C1 111 has specified the value "FALSE" for the mitigation trigger parameter in its configuration negotiation request ("trigger-mitigation: false"). It is assumed that the client C2 112 has specified the value "TRUE" for the mitigation trigger parameter in its configuration negotiation request ("trigger-mitigation: true"). The DOTS server detects a conflict between these two requests, and can proceed to disable automatic mitigation on loss of signal for all the clients of this domain.

Figure 13:
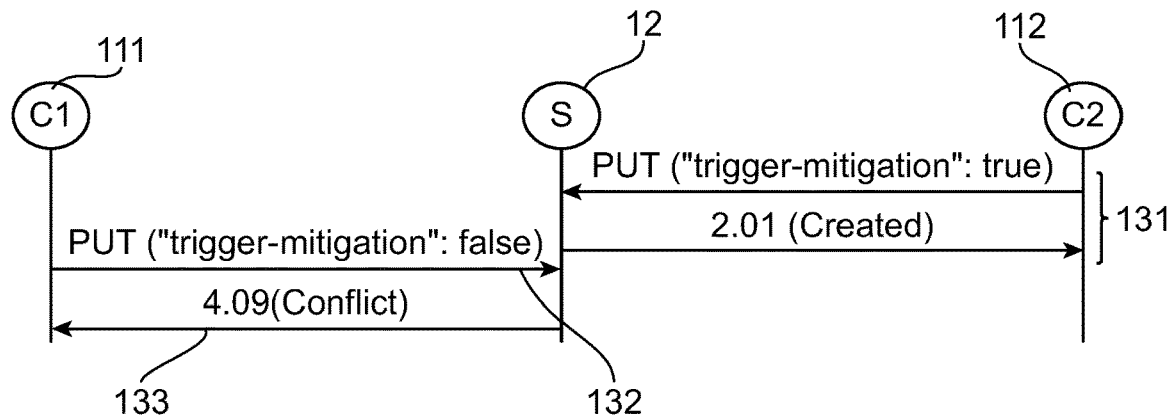
FIGS. 13 and 14 show the detection of conflict between several clients of the same domain.

FIG. 13 shows the case where the second client C2 has established a DOTS session (131) with the server 12 during which it has indicated that the mitigation trigger parameter is set to "trigger-mitigation: true". If the first client C1 subsequently attempts to establish a DOTS session (132) with server 12 and indicates that the mitigation trigger parameter is set to FALSE ("trigger-mitigation: false"), the new request conflicts with the request already maintained by the server.

In particular, if the request maintained by the server indicates that the automatic mitigation on signal loss procedure is disabled (trigger-mitigation: true), then the DOTS server may reject the request from the first client C1, for example with a 4.09 conflict message 133. In particular, the error message may indicate the nature of the conflict ("conflict-trigger-mitigation").

The client C1 can then send a new negotiation request with the mitigation trigger parameter set to "TRUE" ("trigger-mitigation: true").

Figure 14:
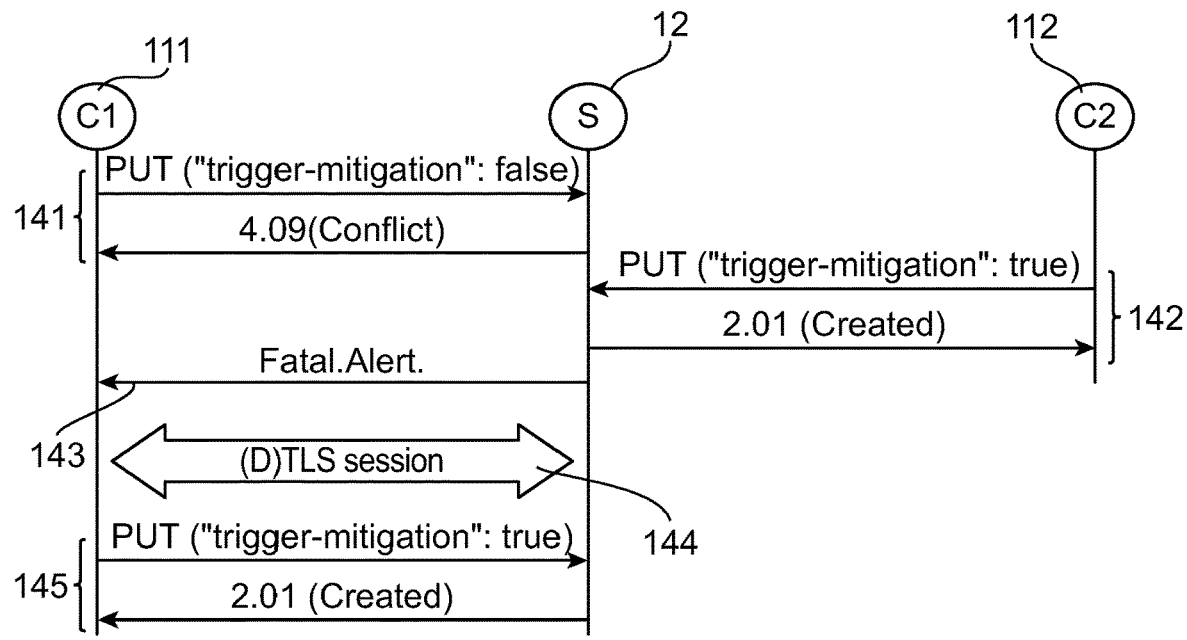

FIG. 14 illustrates the case where the first client C1 has established a DOTS session (141) with the server 12 during which it has indicated that the mitigation trigger parameter is set to FALSE ("trigger-mitigation: false"). If the second client C2 subsequently attempts to establish a DOTS session (142) with the server 12 and indicates that the mitigation trigger parameter is set to TRUE ("trigger-mitigation: true"), the new request conflicts with the request already maintained by the server.

In particular, if the request maintained by the server indicates that the automatic mitigation on signal loss procedure is activated ("trigger-mitigation: false"), then the DOTS server can terminate the TLS or DTLS session with the client C1 having negotiated the "trigger-mitigation: false" parameter. To do this, the DOTS server sends, for example, a Fatal Alert message 143 to the client C1, as described, for example, in the above-mentioned document RFC5246.

The client C1 can then proceed to reset 144 the session with the server and negotiate 145 a new value of the mitigation trigger parameter set to "TRUE" ("trigger-mitigation: true").

5.3 Structures

Figure 15:
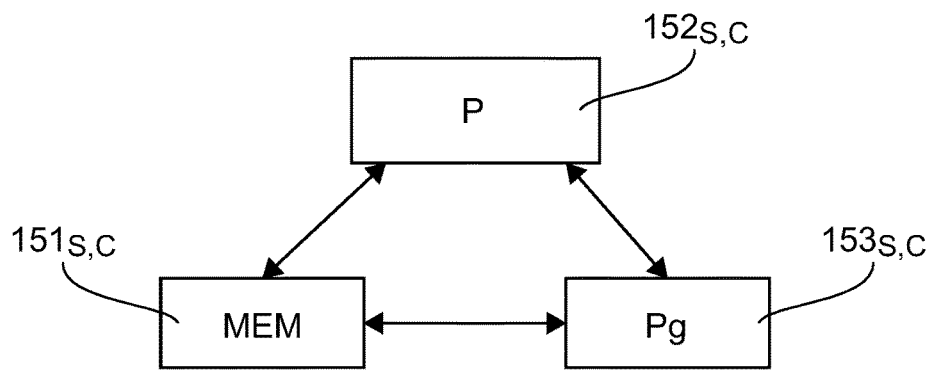
FIG. 15 shows the simplified structure of a server according to a particular embodiment.

Finally, a description is given, in relation to FIG. 15, of the simplified structures of a client node according to one of the embodiments described above.

According to one particular embodiment, a server comprises a memory $151_S$ comprising a buffer memory, a processing unit $152_S$, equipped for example with a programmable computing machine or a dedicated computing machine, for example a processor P, and controlled by the computer program $153_S$, implementing the steps of the method for managing traffic associated with a client domain according to one embodiment of the invention.

At initialisation, the code instructions of the computer program $153_S$ are for example loaded into a RAM memory before being executed by the processor of the processing unit $152_S$.

The processor of the processing unit $152_S$ implements the steps of the method for managing traffic associated with a client domain previously described, according to the instructions of computer program $153_S$, for:

detecting a communication problem between the server and at least one first client node of the client domain, called failed node, identifying at least one second client node belonging to the client domain, verifying if a session between the server and the second node(s) is active, if no session is active: trigger a mitigation procedure on at least one IP resource associated with the client domain, if at least one session is active: use the second node associated with said at least one active session, called active node, to initiate an action managing the traffic associated with the client domain.

According to one particular embodiment, a client node comprises a memory $151_C$ comprising a buffer memory, a processing unit $152_C$, equipped for example with a programmable computing machine or a dedicated computing machine, for example a processor P, and controlled by the computer program $153_C$, implementing the steps of the method for managing traffic associated with a client domain according to one embodiment of the invention.

At initialisation, the code instructions of the computer program $153_C$ are for example loaded into a RAM memory before being executed by the processor of the processing unit $152_C$.

The processor of the processing unit $152_C$ implements steps of the method for managing the traffic associated with a client domain described above, according to the instructions of computer program $153_C$, to receive at least one attack confirmation request message for at least one IP resource associated with the client domain from the server.

The invention claimed is:

1. A method for managing traffic associated with a client domain, implemented in a server, said client domain comprising one or more machines called client nodes, said method comprising:
   detecting a communication problem between said server and at least one first client node of said client domain, called a failed node, the communication problem being detected if a first communication session between the server and the first node is inactive during a predetermined period,
   identifying at least one second client node belonging to said client domain,
   verifying whether a second communication session between said server and said at least one second client node is active, the first and respectively second communication sessions being considered active if presence messages are received by the server from the first and respectively the second client nodes, and
      in response to no second communication session being active between said server and said at least one second client node: triggering a mitigation procedure on at least one IP resource associated with said client domain,
      in response to at least one second communication session being active between said server and said at least one second client node: using the second client node associated with said at least one active second communication session, called an active node, to initiate an action for managing the traffic associated with said client domain.

2. The method according to claim 1, wherein said action for managing the traffic implements a confirmation that an attack is in progress on at least one IP resource associated with said client domain, said confirmation comprising transmitting, to said at least one active second node, at least one attack confirmation request message for at least one IP resource associated with the client domain.

3. The method according to claim 2, comprising receiving at least one error message from said at least one active second node indicating that one or more IP resources identified in said at least one attack confirmation request message do not belong to said client domain, and deleting these IP resources from at least one table maintained by said server.

4. The method according to claim 2, comprising initiating a mitigation procedure on at least one IP resource associated with said client domain if no response to the attack confirmation request message is received for a predetermined period or if at least one received response message, from said at least one active second node, confirms an attack.

5. The method according to claim 1, wherein said action for managing the traffic is a redirection, on said at least one active second node, of at least a part of the traffic associated with at least one IP resource associated with said client domain.

6. The method according to claim 1, comprising verifying that all the client nodes of said client domain have previously agreed to implement the steps of claim 1 that concern them.

7. The method according to claim 6, wherein said verifying implements checking a value of a mitigation trigger parameter associated with each client node of said client domain during a configuration negotiation phase.

8. A method implemented by a second client node of a client domain comprising one or more machines called client nodes, including a first client node and the second client node, the method comprising:
   sending presence messages to a server during an active second communication session with the server;
   managing traffic associated with the client domain during the active second communication session with the server, upon detection by the server of a communication problem between the server and the first client node, called a failed node, the communication problem being detected if a first communication session between the server and the first client node is inactive during a predetermined period, the first and respectively second communication sessions being considered active if presence messages are received by the server from the first and respectively the second client nodes, said managing comprising:
   receiving at least one attack confirmation request message concerning at least one IP resource associated with the client domain, coming from said server;
   transmitting to at least one other client node of the client domain at least one attack verification message;
   receiving from the at least one other client node at least response to said attack verification message; and
   transmitting to the server at least one response message informing said server of the response received from the other client node.

9. The method according to claim 8, comprising verifying that the IP resources identified in said at least one attack confirmation request message are associated with said client domain.

10. The method according to claim 8, wherein:
    transmitting the at least one attack verification message comprises transmitting, to at least one client node of said client domain associated with the IP resources identified in said attack confirmation request message, the at least one attack verification message,
    transmitting to the server the at least one response message comprises transmitting to said server the at least one response message informing said server of the response from said client node associated with the IP resources identified in said at least one attack confirmation request message to said attack verification message.

11. The method according to claim 8, wherein:
    transmitting the at least one attack verification message comprises transmitting, to at least one node of said client domain implementing an attack detection function, the at least one attack verification message relating to the at least one IP resource associated with the client domain;

transmitting to the server the at least one response message comprises transmitting to said server, the at least one response message informing said server of the response from said node implementing an attack detection function.

12. The method according to claim 8, wherein transmitting the at least one attack verification message comprises:
transmitting at least one first attack verification message to at least one client node associated with the IP resources identified in said at least one attack confirmation request message, and/or
transmitting at least one second attack verification message to at least one node of said client domain implementing an attack detection function,
taking into account at least one selection criterion.

13. A server comprising:
at least one programmable computing machine or a dedicated computing machine configured to manage the traffic associated with a client domain, implementing:
detecting a communication problem between said server and at least one first client node of said client domain, called a failed node, said client domain comprising one or more machines called client nodes, the communication problem being detected if a first communication session between the server and the first node is inactive during a predetermined period,
identifying at least one second client node belonging to said client domain,
verifying whether a second communication session between said server and said at least one second client node is active, the first and respectively second communication sessions being considered active if presence messages are received by the server from the first and respectively the second client nodes, and
in response to no second communication session being active between said server and said at least one second client node: triggering a mitigation procedure on at least one IP resource associated with said client domain,
in response to at least one second communication session being active between said server and said at least one second client node: using the second client node associated with said at least one active second communication session, called an active node, to initiate an action managing the traffic associated with said client domain.

14. A second client node comprising:
at least one programmable computing machine or a dedicated computing machine configured to manage traffic associated with a client domain comprising one or more machines, called nodes, including a first client node and the second client node, implementing:
sending presence messages to a server during an active second communication session with the server;
managing traffic associated with the client domain during the active second communication session with the server, upon detection by the server of a communication problem between the server and the first client node, called a failed node, the communication problem being detected if a first communication session between the server and the first client node is inactive during a predetermined period, the first and respectively second communication sessions being considered active if presence messages are received by the server from the first and respectively the second client nodes, said managing comprising:
receiving at least one attack confirmation request message concerning at least one IP resource associated with the client domain, coming from said server;
transmitting to at least one other client node of the client domain at least one attack verification message;
receiving from the at least one other client node at least response to said attack verification message; and
transmitting to the server at least one response message informing said server of the response received from the other client node.

15. A non-transitory computer-readable medium comprising instructions stored thereon for implementing a method for managing traffic associated with a client domain, implemented in a server, said client domain comprising one or more machines called client nodes, when the instructions are executed by a processor of the server, wherein the instructions configure the server to:
detect a communication problem between said server and at least one first client node of said client domain, called a failed node, the communication problem being detected if a first communication session between the server and the first node is inactive during a predetermined period,
identify at least one second client node belonging to said client domain,
verify whether a second communication session between said server and said at least one second client node is active, the first and respectively second communication sessions being considered active if presence messages are received by the server from the first and respectively the second client nodes, and
in response to no second communication session being active between said server and said at least one second client node: trigger a mitigation procedure on at least one IP resource associated with said client domain,
in response to at least one second communication session being active between said server and said at least one second client node: use the second client node associated with said at least one second communication active session, called an active node, to initiate an action managing the traffic associated with said client domain.

* * * * *